(12) United States Patent
Huffman et al.

(10) Patent No.: US 12,412,114 B2
(45) Date of Patent: Sep. 9, 2025

(54) VISUALIZATION SCHEME OF NOISE IN A QUANTUM CIRCUIT

(71) Applicant: International Business Machines Corporation, Armonk, NY (US)

(72) Inventors: Joel Russell Huffman, Austin, TX (US); Ellen R. Kolsto, Austin, TX (US); Paul Gregory Kassebaum, White Plains, NY (US); Jennifer Ranae Glick, Putnam Valley, NY (US); Mark Marrara, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1134 days.

(21) Appl. No.: 17/337,540

(22) Filed: Jun. 3, 2021

(65) Prior Publication Data
US 2022/0391572 A1 Dec. 8, 2022

(51) Int. Cl.
*G06N 10/70* (2022.01)
*G06N 10/20* (2022.01)
*G06N 10/80* (2022.01)

(52) U.S. Cl.
CPC ............ *G06N 10/70* (2022.01); *G06N 10/20* (2022.01); *G06N 10/80* (2022.01)

(58) Field of Classification Search
CPC .................................................. G06N 10/70
See application file for complete search history.

(56) References Cited

U.S. PATENT DOCUMENTS

| | | | |
|---|---|---|---|
| 9,471,280 | B2 | 10/2016 | Shi et al. |
| 10,031,791 | B1 | 7/2018 | Wallman et al. |
| 2018/0096085 | A1 | 4/2018 | Rubin |
| 2019/0044543 | A1 | 2/2019 | Chamberland et al. |
| 2020/0125985 | A1 | 4/2020 | Narang et al. |
| 2021/0216898 | A1* | 7/2021 | Huffman ............ G06F 11/0706 |
| 2022/0188182 | A1* | 6/2022 | Capelluto ............ G06F 11/079 |

FOREIGN PATENT DOCUMENTS

| | | |
|---|---|---|
| WO | 2020081805 A1 | 4/2020 |
| WO | 2020190396 A1 | 9/2020 |

OTHER PUBLICATIONS

Algassert.com, "Quirk: Quantum Circuit Simulator," Retrieved from the Internet: Apr. 30, 2021, https://algassert.com/quirk.

(Continued)

*Primary Examiner* — Joseph D Torres
(74) *Attorney, Agent, or Firm* — Amin, Turocy & Watson, LLP

(57) ABSTRACT

Systems, computer-implemented methods, and computer program products to facilitate generation of a visualization scheme of noise in a quantum circuit are provided. According to an embodiment, a system can comprise a processor that executes computer executable components stored in memory. The computer executable components can comprise a calculation component that can calculate a noise state of a layer in a quantum circuit. The computer executable components can further comprise a visualization component that can render a visual representation of the noise state at the layer in the quantum circuit.

20 Claims, 10 Drawing Sheets

(56) References Cited

OTHER PUBLICATIONS

IBM.com, "Untitled Circuit - IBM Quantum," Retrieved from the Internet: Apr. 30, 2021, https://quantum-computing.bm.com/composer/files/new.

Harper, et al., "Efficient learning of quantum noise," arXiv:1907.13022v1 [quant-ph] Jul. 30, 2019, https://arxiv.org/abs/1907.13022.

Huffman, et al., "Visual Representation of Qubit Stochastic Errors and the Impact On Performance of a Quantum Circuit," U.S. Appl. No. 16/740,663, filed Jan. 13, 2020, 46 pages.

Mel, et al., "The NIST Definition of Cloud Computing," Recommendations of the National Institute of Standards and Technology, Special Publication 800-145, Sep. 2011, 7 pages.

* cited by examiner

```
# Construct a 1-qubit bit-flip and phase-flip errors

# QuantumError on 1 qubits. Noise circuits:
P(0) = 0.05, QasmQobjInstructions = [[{'name': 'x', 'qubits': [0]}]]
P(1) = 0.95, QasmQobjInstructions = [[{'name': 'id', 'qubits': [0]}]]

p_error = 0.05
bit_flip = pauli_error([('X', p_error), ('I', 1 - p_error)])
phase_flip = pauli_error([('Z', p_error), ('I', 1 - p_error)])
```

FIG. 3

VISUALIZATION SCHEME OF NOISE IN A QUANTUM CIRCUIT

BACKGROUND

The embodiments described herein relate to quantum circuits, and more specifically, to a visualization scheme of noise in a quantum circuit.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that can facilitate generation of a visualization scheme of noise in a quantum circuit are described.

According to an embodiment, a system can comprise a processor that executes computer executable components stored in memory. The computer executable components can comprise a calculation component that can calculate a noise state of a layer in a quantum circuit. The computer executable components can further comprise a visualization component that can render a visual representation of the noise state at the layer in the quantum circuit.

According to another embodiment, a computer-implemented method can comprise calculating, by a system operatively coupled to a processor, a noise state of a layer in a quantum circuit. The computer-implemented method can further comprise rendering, by the system, a visual representation of the noise state at the layer in the quantum circuit.

According to another embodiment, a computer program product comprising a computer readable storage medium having program instructions embodied therewith, the program instructions executable by a processor to cause the processor to calculate a noise state of a layer in a quantum circuit. The program instructions are further executable by the processor to cause the processor to render a visual representation of the noise state at the layer in the quantum circuit.

DESCRIPTION OF THE DRAWINGS

FIG. 3 illustrates an example, non-limiting noise model that can be used to facilitate generation of a visualization scheme of noise in a quantum circuit in accordance with one or more embodiments described herein.

DETAILED DESCRIPTION

Figure 1:
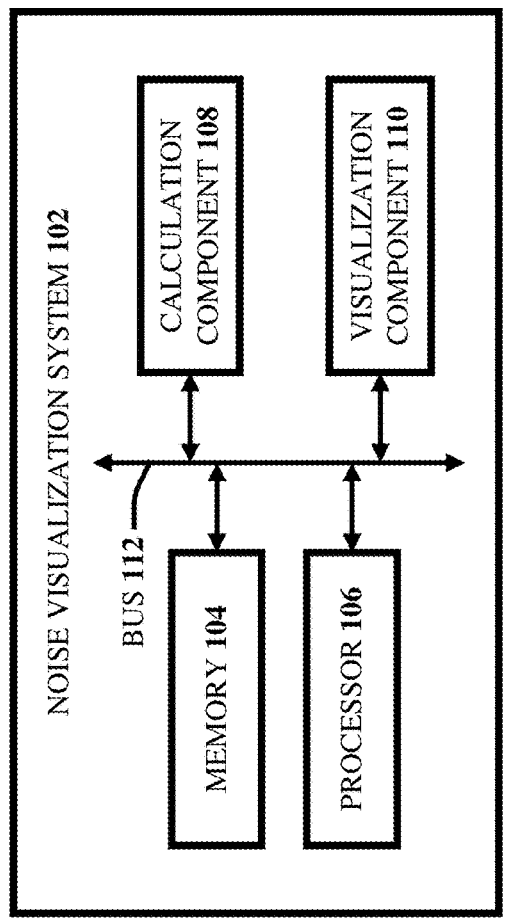
FIGS. 1 and 2 illustrate block diagrams of example, non-limiting systems that can each facilitate generation of a visualization scheme of noise in a quantum circuit in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As referenced herein, an "entity" can comprise a human, a client, a user, a computing device, a software application, an agent, a machine learning (ML) model, an artificial intelligence (AI) model, and/or another entity. It will be understood that when a component and/or an element is referred to herein as being "coupled" to another component and/or element, respectively, it can describe one or more different types of coupling including, but not limited to, communicative coupling, electrical coupling, operative coupling, optical coupling, physical coupling, and/or another type of coupling.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, can entangle multiple quantum bits, and use interference.

Noise can cause error in a quantum circuit that can drastically affect the output of the circuit. Noise in quantum computing is not generally factored into existing tools used to learn quantum computing, and this can be a significant impediment for entities trying to learn quantum computing with real devices. The results may not be what was expected, and it may not be clear why.

In accordance with one or more embodiments described herein, a method is provided to present noise earlier on in a way that is understandable and digestible because it is visual. By being able to visualize the noise associated with the quantum hardware in accordance with one or more embodiments described herein, it will be easier to understand the limitation of near-term quantum hardware, and how noise affects the results of a given circuit.

In accordance with one or more embodiments described herein, a method is provided to create a visualization of the noise of a quantum circuit by showing the ideal, noiseless value in a first type of visualization (e.g., grayscale) next to a version with a noise model in a second type of visualization (e.g., shades of blue). In some embodiments, opacity and/or a range of opacity values can be used to show the probability density, where a probability of 0 can correspond to a first opacity value (e.g., 0 percent (%) opaque), and a probability of 1 can correspond to a second opacity value (e.g., 100% opaque).

Figure 2:
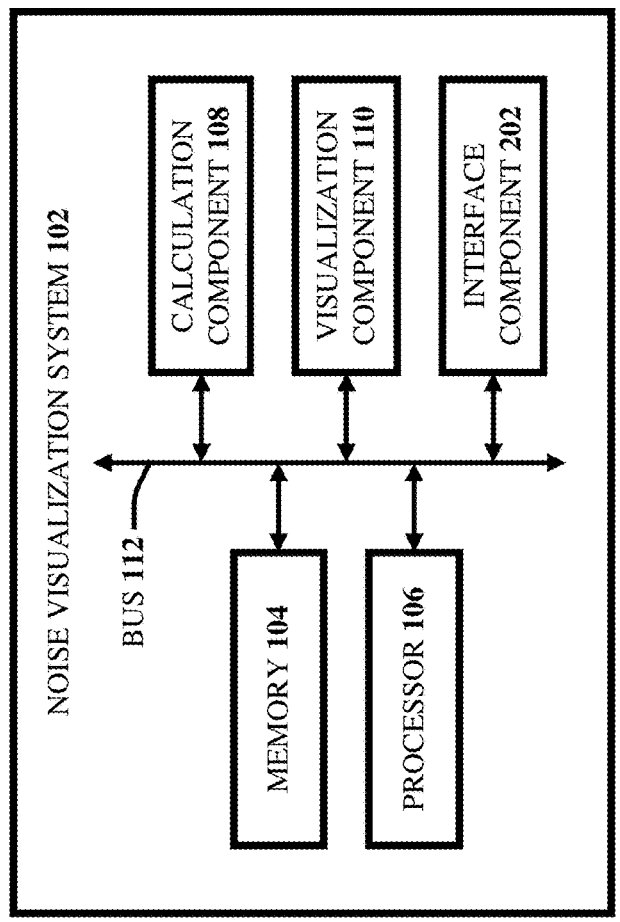

FIGS. 1 and 2 illustrate block diagrams of example, non-limiting systems 100 and 200, respectively, that can each facilitate generation of a visualization scheme of noise in a quantum circuit in accordance with one or more embodiments described herein. System 100 and 200 can each comprise a noise visualization system 102. Noise visualization system 102 of system 100 depicted in FIG. 1 can comprise a memory 104, a processor 106, a calculation component 108, a visualization component 110, and a bus 112. Noise visualization system 102 of system 200 depicted in FIG. 2 can further comprise an interface component 202.

It should be appreciated that the embodiments described herein and/or depicted in various figures are for illustration only, and as such, the architecture of such embodiments are not limited to the systems, devices, and/or components depicted therein. For example, in some embodiments, system 100, system 200, and/or noise visualization system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1, FIG. 2, and/or other figures disclosed herein.

Memory 104 can comprise a computer-readable memory that can store one or more computer and/or machine readable, writable, and/or executable components and/or instructions that, when executed by processor 106 (e.g., a classical processor, a graphics processing unit (GPU), a quantum processor, and/or another type of processor), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to noise visualization system 102, calculation component 108, visualization component 110, interface component 202, and/or another component associated with noise visualization system 102 as described herein with or without reference to the various figures.

Memory 104 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 104 are described below with reference to system memory 816 and FIG. 8. Such examples of memory 104 can be employed to implement any embodiments described herein.

Processor 106 can comprise one or more types of processors and/or electronic circuitry (e.g., a classical processor (e.g., a central processing unit (CPU)), a GPU, a quantum processor (e.g., a quantum processing unit (QPU)), and/or another type of processor and/or electronic circuitry) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more CPU, multi-core processor, microprocessor, dual microprocessors, microcontroller, System on a Chip (SOC), array processor, vector processor, quantum processor, and/or another type of processor. In some embodiments, processor 106 can comprise a processing unit (e.g., a GPU) that has a greater number of cores (e.g., 100 times, 500 times, or 1000 times as many cores) than that of a classical processor (e.g., a CPU). In these embodiments, processor 106 can comprise such a processing unit (e.g., a GPU) that can provide a greater capacity to perform parallel processing and/or can comprise a larger memory bandwidth than that of classical processor (e.g., a CPU). For example, processor 106 can comprise a GPU that has a greater capacity to perform parallel processing (e.g., via a greater number of cores (e.g., 100 times, 500 times, or 1000 times as many cores) than that of a classical processor (e.g., a CPU)) and/or that has a larger memory bandwidth than that of a classical processor (e.g., a CPU). Further examples of processor 106 are described below with reference to processing unit 814 and FIG. 8. Such examples of processor 106 can be employed to implement any embodiments described herein.

Noise visualization system 102, memory 104, processor 106, calculation component 108, visualization component 110, interface component 202, and/or another component of noise visualization system 102 as described herein can be communicatively, electrically, operatively, and/or optically coupled to one another via bus 112 to perform functions of system 100, system 200, noise visualization system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments described herein.

Noise visualization system 102 can comprise any type of component, machine, device, facility, apparatus, and/or instrument that comprises a processor and/or can be capable of effective and/or operative communication with a wired and/or wireless network. All such embodiments are envisioned. For example, noise visualization system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Noise visualization system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, noise visualization system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, noise visualization system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet), a local area network (LAN), and/or another network. Noise visualization system 102 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, noise visualization system 102 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between noise visualization system 102 and external systems, sources, and/or devices (e.g., computing devices, communication devices, and/or another type of external system, source, and/or device).

Noise visualization system 102 can comprise one or more computer and/or machine readable, writable, and/or executable components and/or instructions that, when executed by processor 106 (e.g., a classical processor, a GPU, a quantum processor, and/or another type of processor), can facilitate performance of operations defined by such component(s) and/or instruction(s). Further, in numerous embodiments, any component associated with noise visualization system 102, as described herein with or without reference to the various figures, can comprise one or more computer and/or machine readable, writable, and/or executable components and/or instructions that, when executed by processor 106, can facilitate performance of operations defined by such component(s) and/or instruction(s). For example, calculation component 108, visualization component 110, interface component 202, and/or another component of, and/or associated with, noise visualization system 102 as disclosed herein (e.g., communicatively, electronically, operatively, and/or optically coupled with and/or employed by noise visualization system 102), can comprise such computer and/or machine readable, writable, and/or executable component(s) and/or instruction(s). Consequently, according to numerous embodiments, noise visualization system 102 and/or any components of and/or associated therewith, as disclosed herein, can employ processor 106 to execute such computer and/or machine readable, writable, and/or executable component(s) and/or instruction(s) to facilitate performance of one or more operations described herein with reference to noise visualization system 102 and/or any such components of and/or associated therewith.

Noise visualization system 102 can facilitate (e.g., via processor 106) performance of operations executed by and/or associated with calculation component 108, visualization component 110, interface component 202, and/or another component of and/or associated with noise visualization system 102 as disclosed herein. For example, as described in detail below, noise visualization system 102 can facilitate (e.g., via processor 106): calculating a noise state (e.g., a noise state vector) of a layer in a quantum circuit; and/or rendering a visual representation of the noise state at the layer in the quantum circuit.

In another example, as described in detail below, noise visualization system 102 can facilitate (e.g., via processor 106): calculating the noise state based on at least one of a specification or a noise model of a computation component that executes the quantum circuit.

In some embodiments, the noise state can comprise a noisy state (e.g., a noisy state vector). In some embodiments, the noise state can comprise a noiseless state (e.g., a noiseless state vector). In some embodiments, the visual representation can comprise a visualization of a probability density corresponding to the noise state. In some embodiments, the visual representation can comprise a gradient representation of a probability density corresponding to the noise state, where a defined opacity value of the gradient representation corresponds to a defined probability value of the noise state.

In another example, as described in detail below, noise visualization system 102 can facilitate (e.g., via processor 106): calculating a noiseless state (e.g., a noiseless state vector) and a noisy state (e.g., noisy state vector) of the layer in the quantum circuit; and/or rendering a first visual representation of the noiseless state and a second visual representation of the noisy state at the layer in the quantum circuit.

In another example, as described in detail below, noise visualization system 102 can facilitate (e.g., via processor 106): rendering, at multiple layers of the quantum circuit, visual representations of noiseless states and noisy states of the multiple layers to provide a visualization of noise effects on the quantum circuit, thereby facilitating at least one of reduced time or processing workload associated with generating at least one quantum circuit that yields a defined result when executed.

As described below with reference to the example embodiments illustrated in FIGS. 3-5, calculation component 108 and/or visualization component 110 can each perform one or more of the above described operations that can be facilitated by noise visualization system 102. In an example, calculation component 108 can calculate a noise state (e.g., a noise state vector) of a layer in a quantum circuit and visualization component 110 can render a visual representation of the noise state at the layer in the quantum circuit. In some embodiments, calculation component 108 can calculate a noiseless state (e.g., a noiseless state vector) of the layer in the quantum circuit. In some embodiments, calculation component 108 can calculate a noisy state (e.g., a noisy state vector) of the layer in the quantum circuit. In some embodiments, calculation component 108 can calculate a noiseless state (e.g., a noiseless state vector) and a noisy state (e.g., a noisy state vector) of the layer in the quantum circuit.

In another example, calculation component 108 can calculate the noise state based on (e.g., using) a specification and/or a noise model of a computation component that can execute the quantum circuit. For instance, calculation component 108 can calculate the noise state based on (e.g., using) a specification and/or a noise model of a quantum computing system and/or device that can execute the quantum circuit, where such a quantum computing system and/or device can be external to noise visualization system 102. For example, calculation component 108 can calculate the noise state based on (e.g., using) a specification and/or a noise model of a quantum computing system and/or device such as, for instance, a quantum computer, a QPU, quantum hardware, and/or another quantum computing system and/or device that can execute the quantum circuit and/or be external to noise visualization system 102. In some embodiments, an entity as defined herein can define and/or input such a specification and/or noise model into noise visualization system 102 using, for instance, an interface component of noise visualization system 102. For instance, the entity can define and/or input such a specification and/or noise model into noise visualization system 102 using interface component 202 described below.

In some embodiments, the visual representation can comprise a visualization of a probability density corresponding to the noise state. In some embodiments, the visual representation can comprise a gradient representation of a probability density corresponding to the noise state, where a defined opacity value of the gradient representation corresponds to a defined probability value of the noise state.

In an example embodiment, calculation component 108 can calculate a noiseless state and a noisy state of the layer in the quantum circuit and visualization component 110 can render a first visual representation of the noiseless state and a second visual representation of the noisy state at the layer in the quantum circuit. In this example embodiment, calculation component 108 can calculate the noiseless state and/or the noisy state of the layer in the quantum circuit based on (e.g., using) a specification and/or a noise model of a computation component that can execute the quantum circuit. For instance, in this example embodiment, calculation component 108 can calculate the noiseless state and/or the noisy state based on (e.g., using) a specification and/or a noise model of a quantum computing system and/or device (e.g., a quantum computer, a QPU, quantum hardware, and/or another quantum computing system and/or device) that can execute the quantum circuit and/or be external to noise visualization system 102. In this example embodiment, an entity as defined herein can define and/or input such a specification and/or noise model into noise visualization system 102 using, for instance, interface component 202 described below.

In some embodiments, the first visual representation can comprise a first visualization of a first probability density corresponding to the noiseless state and the second visual representation can comprise a second visualization of a second probability density corresponding to the noisy state. In some embodiments, the first visual representation can comprise a first gradient representation of a first probability density corresponding to the noiseless state, where a first defined opacity value of the first gradient representation corresponds to a first defined probability value of the noiseless state. In some embodiments, the second visual representation can comprise a second gradient representation of a second probability density corresponding to the noisy state, where a second defined opacity value of the second gradient representation corresponds to a second defined probability value of the noisy state.

In another example, visualization component 110 can render, at multiple layers of the quantum circuit, visual representations of noiseless states and noisy states of the multiple layers to provide a visualization of noise effects on the quantum circuit. In this example, it should be appreciated that, based on providing such a visualization of noise effects on the quantum circuit, noise visualization system 102 can thereby facilitate at least one of reduced time or processing workload associated with generating at least one quantum circuit that yields a defined result when executed. For instance, it should be appreciated that, based on providing such a visualization of noise effects on the quantum circuit, noise visualization system 102 can thereby facilitate at least one of reduced time or processing workload associated with defining an optimized quantum circuit that yields a desired result when executed. That is, for example, it should be appreciated that noise visualization system 102 can provide a new, useful, and/or advantageous system, computer-implemented methodology, and/or computer program product to facilitate viewing and/or analyzing data from one or more layers of a quantum circuit that can enable an entity to understand the quantum circuit more holistically (e.g., compared to existing technologies). In this example, based on such improved holistic understanding of the quantum circuit, noise visualization system 102 can thereby enable such an entity to reduce the time and/or processing workload involved with iteratively modifying one or more elements of the quantum circuit until it yields a desired result (e.g., an optimized result) when executed.

In some embodiments, an entity as defined herein can employ interface component 202 to facilitate one or more of the above described operations in accordance with one or more embodiments described herein. For example, in some embodiments, interface component 202 can comprise a graphical user interface (GUI), an application programming interface (API), a representational state transfer (REST) API, and/or another interface component. In these example embodiments, such an entity can employ interface component 202 to define and/or input instructions and/or commands to noise visualization system 102. For instance, the entity can employ interface component 202 to define an acceptable error threshold. In another example, where calculation component 108 can calculate the noisy state of a layer in a quantum circuit based (e.g., using) on a specification and/or a noise model of a quantum computing component that can execute the quantum circuit, the entity can employ interface component 202 to define and/or input such a specification and/or noise model. In another example, an entity as defined herein can employ interface component 202 to view and/or analyze one or more visual representations of noiseless states and/or noisy states of multiple layers in a quantum circuit, where such visual representation(s) can be rendered by visualization component 110 at the multiple layers to provide a visualization of noise effects on the quantum circuit.

The following is an example application of noise visualization system 102 that can be implemented in accordance with one or more embodiments described herein:

1. An entity can choose (e.g., via interface component 202) to run a quantum circuit on a quantum backend or a noisy hardware simulation as follows.
   1.a. If real (e.g., physical) quantum hardware is used, the entity can choose (e.g., via interface component 202) to import metadata about the connectivity and/or topology of the quantum hardware (e.g., quantum backend hardware).
   1.b. The entity can choose (e.g., interface component 202) to import one or more noise models corresponding to the quantum hardware, or one or more generic models.
2. Noise visualization system 102 can compute imported information as follows.
   2.a. Noise visualization system 102 can transpile (e.g., via a quantum-based transpiler) the quantum circuit to run on the quantum hardware if real (e.g., physical) quantum hardware is selected.
   2.b. Noise visualization system 102 can calculate (e.g., via calculation component 108) the noiseless state of one or more layers of the quantum circuit according to specifications of the quantum backend or noisy hardware simulation.
   2.c. Noise visualization system 102 can calculate (e.g., via calculation component 108) the noisy state of one or more layers of the quantum circuit based on (e.g., using) the noise model(s) chosen by the entity that can be applied to the quantum circuit by noise visualization system 102.
3. Noise visualization system 102 can generate and/or render one or more visualizations of the noiseless state and/or the noisy state based on data described above.
   3.a. Noise visualization system 102 can render (e.g., via visualization component 110) a visualization of the probability density of the state at one or more layers of the quantum circuit.
   3.b. Noise visualization system 102 can render (e.g., via visualization component 110) visualizations of probability densities in, for instance, an arbitrary pair of different visualizations.
   3.b.i. Noise visualization system 102 can render (e.g., via visualization component 110) a visualization of the noiseless state in one style and/or format, where the noiseless state can be calculated (e.g., via calculation component 108) as described above.
   3.b.ii. Noise visualization system 102 can render (e.g., via visualization component 110) a visualization of the noisy state in another style and/or format.
   3.c. Noise visualization system 102 can render (e.g., via visualization component 110) the visualizations such that each visualization has, for example, an opacity based on the probability of a given state.
   3.d. Noise visualization system 102 can render (e.g., via visualization component 110) the visualizations such that the higher the opacity, the closer the probability of a state is to 1.
   3.e. Noise visualization system 102 can render (e.g., via visualization component 110) the visualizations such that the lower the opacity, the closer the probability of a state is to 0.
   3.f. Noise visualization system 102 can render (e.g., via visualization component 110) the visualizations such that the amount of noise from the noise model either increases or decreases the opacity of the noisy state relative to the noiseless state.
   3.g. Noise visualization system 102 can render (e.g., via visualization component 110) the visualizations such that the noisy and noiseless probability rows are rendered side by side at one or more layers (e.g., each layer) of the quantum circuit.
   3.h. Noise visualization system 102 can render (e.g., via visualization component 110) the visualizations such that the probability rows for the entire quantum circuit are rendered simultaneously so the entity has an image of all states of the quantum circuit at a glance.
4. The entity can view the entire visualization juxtaposed with the circuit to enable analysis and/or reference. For example, noise visualization system 102 can render (e.g., via visualization component 110) the visualizations below or interleaved with the original circuit.

FIG. 3 illustrates an example, non-limiting noise model 300 that can be used to facilitate generation of a visualization scheme of noise in a quantum circuit in accordance with one or more embodiments described herein. Repetitive description of like elements and/or processes employed in respective embodiments is omitted for sake of brevity.

As described above with reference to the example embodiments illustrated in FIGS. 1 and 2, calculation component 108 can calculate a noise state of a layer in a quantum circuit based on (e.g., using) a specification and/or a noise model of a computation component that can execute the quantum circuit. For example, calculation component 108 can calculate the noisy state of the layer in the quantum circuit based on (e.g., using) a noise model of a quantum computing system and/or device (e.g., a quantum computer, a QPU, quantum hardware, and/or another quantum computing system and/or device) that can execute the quantum circuit and/or be external to noise visualization system 102.

Noise model 300 illustrated in FIG. 3 can comprise an example of such noise model described above that can be used by calculation component 108 to calculate the noisy state of a layer in a quantum circuit in accordance with one or more embodiments described herein. Based on such calculation of the noisy state using noise model 300, visualization component 110 can render one or more visual representations of the noisy state at the layer in the quantum circuit in accordance with one or more embodiments described herein. For example, as described below and illustrated in visualization scheme 400 depicted in FIG. 4, calculation component 108 can use noise model 300 to respectively calculate the noisy state (e.g., noisy state vector) of each layer 402a, 402b, 402c, 402d, 402e, 402f in a single qubit (1-qubit) quantum circuit having an X gate applied multiple times. In this example, as described below and illustrated in visualization scheme 400 depicted in FIG. 4, based on such noisy state calculations using noise model 300, visualization component 110 can respectively render noisy state vector visualizations 406 of the noisy state at each layer 402a, 402b, 402c, 402d, 402e, 402f in the 1-qubit quantum circuit.

Figure 4:
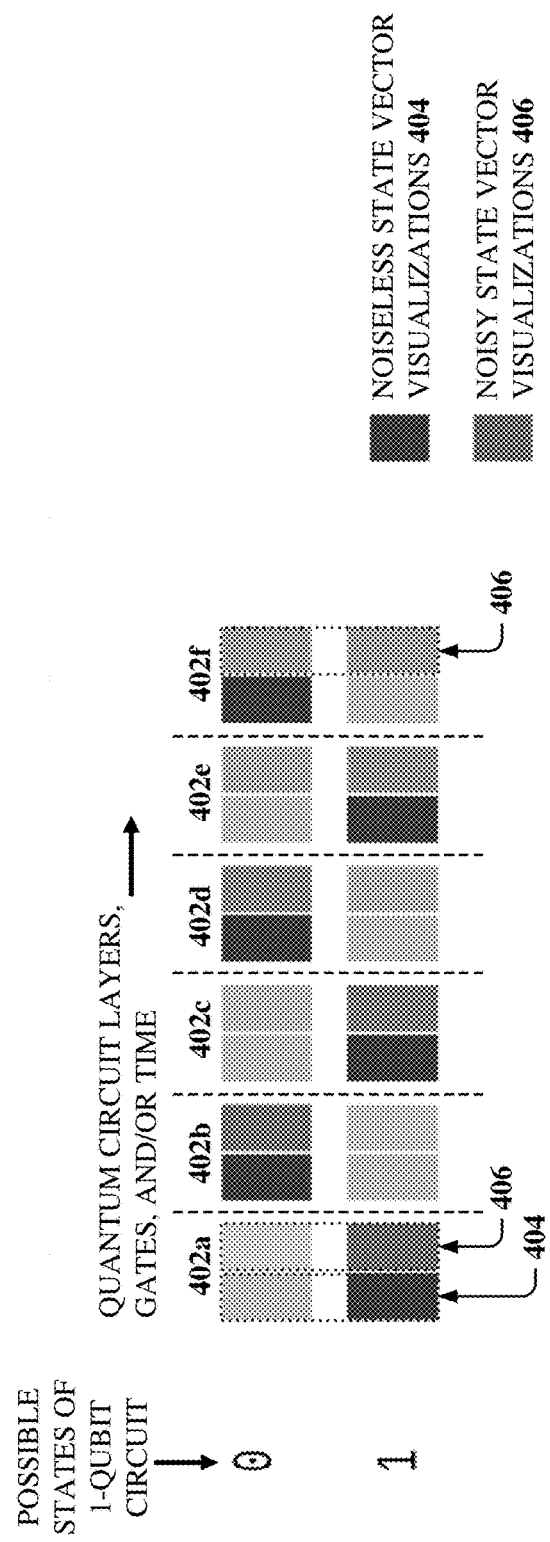
FIG. 4 illustrates an example, non-limiting visualization scheme that can be generated in accordance with one or more embodiments described herein.

FIG. 4 illustrates an example, non-limiting visualization scheme 400 that can be generated in accordance with one or more embodiments described herein. Repetitive description of like elements and/or processes employed in respective embodiments is omitted for sake of brevity.

In the example embodiment depicted in FIG. 4, visualization scheme 400 can comprise a visualization of noise in a 1-qubit quantum circuit with an X gate applied 6 times, where such applications of an X gate constitute layers 402a, 402b, 402c, 402d, 402e, 402f of the 1-qubit quantum circuit. In this example embodiment, calculation component 108 can respectively calculate the noiseless state (e.g., noiseless state vector) of each layer 402a, 402b, 402c, 402d, 402e, 402f in the 1-qubit quantum circuit using, for instance, specifications of a quantum system and/or a quantum device that can execute the 1-qubit quantum circuit. In this example embodiment, calculation component 108 can use noise model 300 to respectively calculate the noisy state (e.g., noisy state vector) of each layer 402a, 402b, 402c, 402d, 402e, 402f in the 1-qubit quantum circuit.

In the example embodiment depicted in FIG. 4, based on the above described noiseless state calculations that can be performed by calculation component 108, visualization component 110 can respectively render noiseless state vector visualizations 404 of the noiseless state at each layer 402a, 402b, 402c, 402d, 402e, 402f in the 1-qubit quantum circuit. For clarity, only one set of noiseless state vector visualizations 404 is annotated at layer 402a of the 1-qubit quantum circuit illustrated in FIG. 4. In the example embodiment depicted in FIG. 4, based on the above described noisy state calculations that can be performed by calculation component 108 using noise model 300, visualization component 110 can respectively render noisy state vector visualizations 406 of the noisy state at each layer 402a, 402b, 402c, 402d, 402e, 402f in the 1-qubit quantum circuit. For clarity, only two sets of noisy state vector visualizations 406 are annotated at layer 402a and layer 402f of the 1-qubit quantum circuit illustrated in FIG. 4.

In the example noise model 300 described above and illustrated in FIG. 3, the correct probability distribution is 7:3 with a 5% increase in error for every X gate. In the example embodiment depicted in FIG. 4, the 7:3 correct probability distribution with the 5% increase in error for every X gate is illustrated in noiseless state vector visualizations 404 as 70% opacity and 30% opacity for the noiseless case at each layer 402a, 402b, 402c, 402d, 402e, 402f of the 1-qubit quantum circuit. In this example embodiment, the noisy case starts at 70% opacity and 30% opacity as well (e.g., as illustrated in noisy state vector visualizations 406 at layer 402a), but every application of an X gate has the value change by 5% until both states (e.g., the |0> state and the |1> state) are 50% opacity (e.g., as illustrated in noisy state vector visualizations 406 at layer 402l), at which point the results are entirely drowned out by noise.

Although visualization scheme 400 illustrated in FIG. 4 demonstrates the application of noise visualization system 102 to a 1-qubit quantum circuit, it should be appreciated that the embodiments described herein are not so limiting. For example, noise visualization system 102, and/or one or more operations that can be performed by noise visualization system 102 in accordance with one or more embodiments described herein, can be applied to a quantum circuit having N qubits. For instance, as demonstrated by visualization scheme 502 described below and depicted in FIG. 5, noise visualization system 102, and/or one or more operations that can be performed by noise visualization system 102 in accordance with one or more embodiments described herein, can be applied to a 6-qubit quantum circuit.

Figure 5:
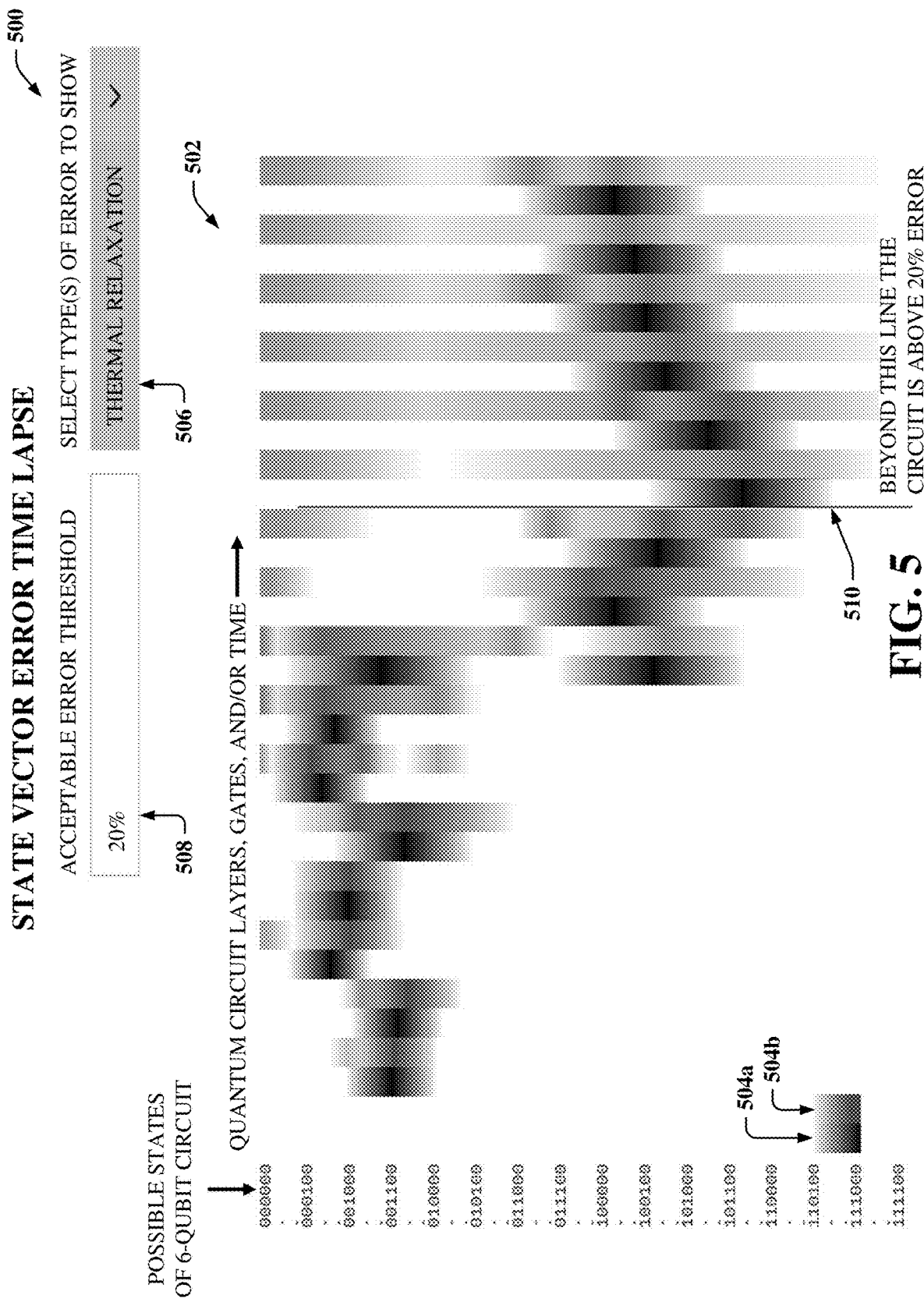
FIG. 5 illustrates an example, non-limiting interface component that can facilitate generation of a visualization scheme of noise in a quantum circuit in accordance with one or more embodiments described herein.

FIG. 5 illustrates an example, non-limiting interface component 500 that can facilitate generation of a visualization scheme of noise in a quantum circuit in accordance with one or more embodiments described herein. Repetitive description of like elements and/or processes employed in respective embodiments is omitted for sake of brevity.

In the example embodiment depicted in FIG. 5, interface component 500 can comprise an example, non-limiting embodiment of interface component 202 described above and illustrated in FIG. 2. In this example embodiment, interface component 500 can comprise the same structure and/or functionality as that of interface component 202 described above and illustrated in FIG. 2.

As illustrated in the example embodiment depicted in FIG. 5, interface component 500 can comprise a visualization scheme 502. In this example embodiment, visualization scheme 502 can comprise an example, non-limiting alternative embodiment of visualization scheme 400 depicted in FIG. 4. In this example embodiment, visualization scheme 502 can comprise a visualization of noise in a 6-qubit quantum circuit, where visualization scheme 502 can be generated by noise visualization system 102 in accordance with one or more embodiments described herein.

In the example embodiment illustrated in FIG. 5, there are too many qubits to show discrete steps between states, and therefore, noise visualization system 102 (e.g., via calculation component 108, visualization component 110, and/or interface component 500) can render one or more gradient visualizations 504a, 504b to represent the probability distributions corresponding to the noiseless and noisy states at each layer in the 6-qubit quantum circuit. In this example embodiment, noise visualization system 102 (e.g., via calculation component 108, visualization component 110, and/or interface component 500) can respectively render a gradient visualization 504a at each layer of the 6-qubit quantum circuit to represent the probability distribution corresponding to the noiseless state of each of such layers. In this example embodiment, noise visualization system 102 (e.g., via calculation component 108, visualization component 110, and/or interface component 500) can respectively render a gradient visualization 504b at each layer of the 6-qubit quantum circuit to represent the probability distribution corresponding to the noisy state of each of such layers. For clarity, only the first set of gradient visualizations 504a, 504b are annotated at the first layer of the 6-qubit quantum circuit depicted in FIG. 5.

In the example embodiment depicted in FIG. 5, calculation component 108 can respectively calculate the noiseless state (e.g., noiseless state vector) of each layer in the 6-qubit quantum circuit using, for instance, specifications of a quantum system and/or a quantum device that can execute the 6-qubit quantum circuit. In this example embodiment, based on such calculation of the noiseless state of each layer in the 6-qubit quantum circuit, visualization component 110 can render gradient visualizations 504a in visualization scheme 502 as described above and illustrated in FIG. 5. In the example embodiment illustrated in FIG. 5, calculation component 108 can use a noise model to respectively calculate the noisy state (e.g., noisy state vector) of each layer in the 6-qubit quantum circuit, where an entity implementing noise visualization system 102 can select such a noise model from drop-down menu 506 of interface component 500. For example, as illustrated in the example embodiment depicted in FIG. 5, such an entity can select a "THERMAL RELAXATION" noise model from drop-down menu 506. In this example embodiment, based on such selection of a noise model (e.g., THERMAL RELAXATION) by the entity and such calculation of the noisy state of each layer in the 6-qubit quantum circuit, visualization component 110 can render gradient visualizations 504b in visualization scheme 502 as described above and illustrated in FIG. 5. It should be appreciated that, in this example embodiment, by allowing the entity to select (e.g., via drop-down menu 506) different noise models, noise visualization system 102 can thereby enable the entity to better understand how various types of error affect the performance of the 6-qubit quantum circuit.

As illustrated in the example embodiment depicted in FIG. 5, interface component 500 can comprise a text field 508 that can enable an entity implementing noise visualization system 102 to input a threshold for an acceptable level of error (e.g., a 20% acceptable error threshold as illustrated in FIG. 5). In this example embodiment, based on such an acceptable error threshold that can be input to text field 508 by the entity, noise visualization system 102 (e.g., via visualization component 110 and/or interface component 500) can render a threshold visualization 510 in visualization scheme 502 as illustrated in FIG. 5 to highlight the layer, gate(s), and/or the time when the level of error affecting a circuit has passed the acceptable error threshold.

Figure 6:
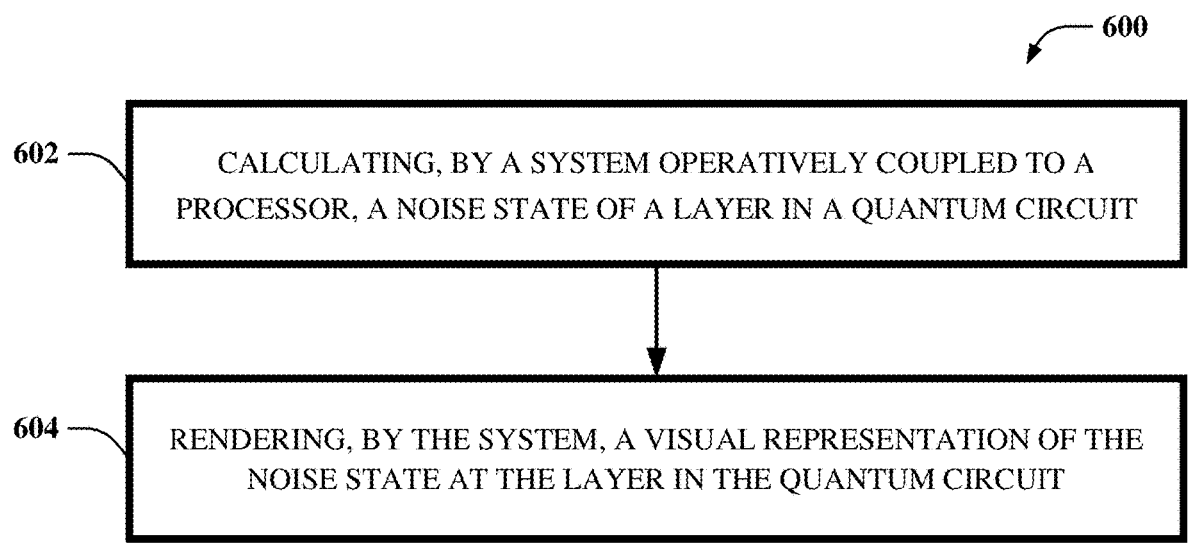
FIGS. 6 and 7 illustrate flow diagrams of example, non-limiting computer-implemented methods that can each facilitate generation of a visualization scheme of noise in a quantum circuit in accordance with one or more embodiments described herein.

FIG. 6 illustrates a flow diagram of an example, non-limiting computer-implemented method 600 that can facilitate generation of a visualization scheme of noise in a quantum circuit in accordance with one or more embodiments described herein. Repetitive description of like elements and/or processes employed in respective embodiments is omitted for sake of brevity.

At 602, computer-implemented method 600 can comprise calculating, by a system (e.g., via noise visualization system 102 and/or calculation component 108) operatively coupled to a processor (e.g., processor 106), a noise state (e.g., a noiseless state and/or a noisy state) of a layer in a quantum circuit. For example, in some embodiments, at 602, computer-implemented method 600 can comprise calculating, by the system (e.g., via noise visualization system 102 and/or calculation component 108), a noiseless state and/or a noisy state of the layer in the quantum circuit.

At 604, computer-implemented method 600 can comprise rendering, by the system (e.g., via noise visualization system 102, visualization component 110, and/or interface component 202), a visual representation of the noise state at the layer in the quantum circuit. For example, in some embodiments, at 604, computer-implemented method 600 can comprise rendering, by the system (e.g., via noise visualization system 102 and/or visualization component 110), at the layer in the quantum circuit, a first visual representation of a noiseless state of the layer and a second visual representation of a noisy state of the layer in the quantum circuit.

Figure 7:
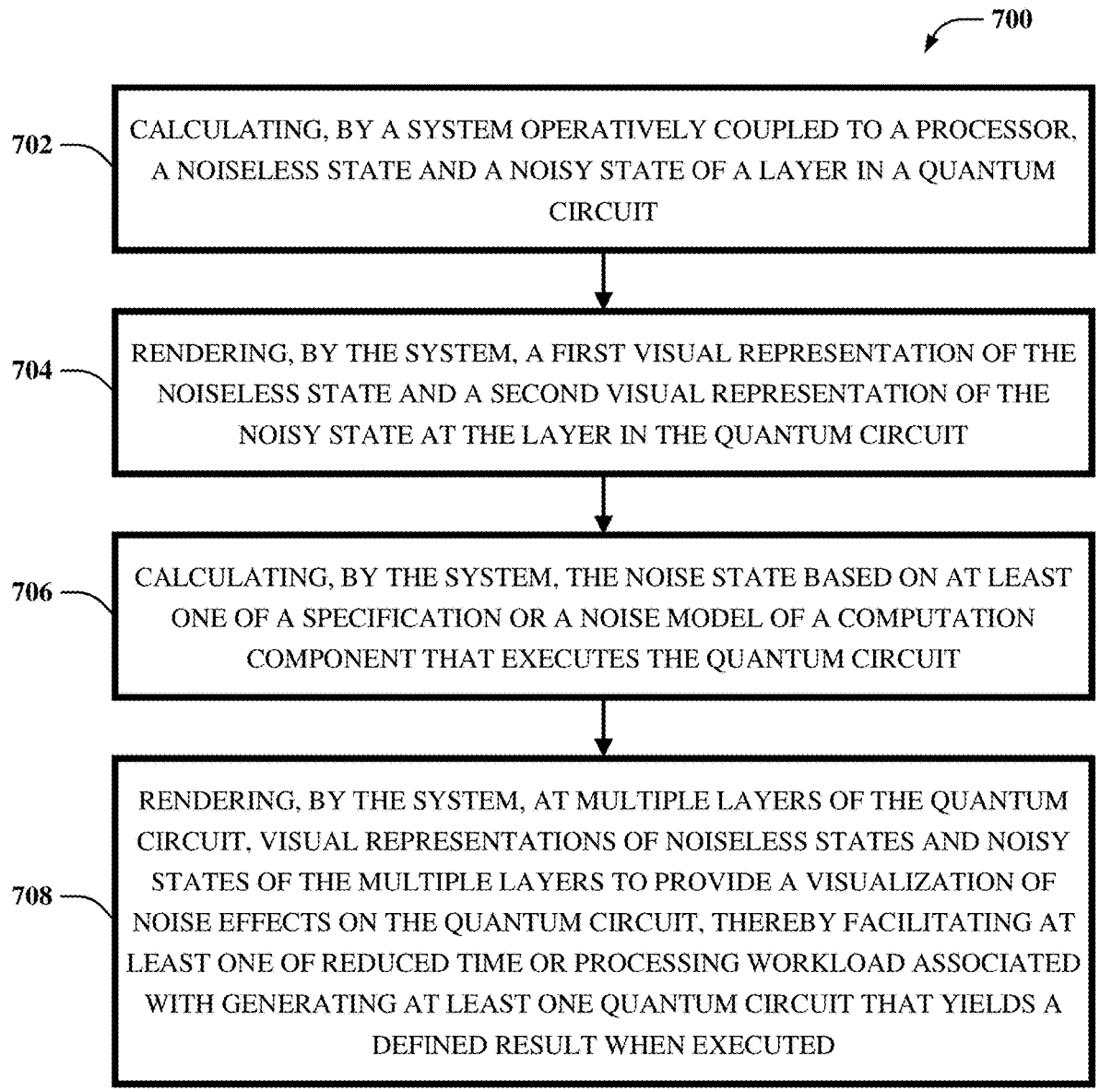

FIG. 7 illustrates a flow diagram of an example, non-limiting computer-implemented method 700 that can facilitate generation of a visualization scheme of noise in a quantum circuit in accordance with one or more embodiments described herein. Repetitive description of like elements and/or processes employed in respective embodiments is omitted for sake of brevity.

At 702, computer-implemented method 700 can comprise calculating, by a system (e.g., via noise visualization system 102 and/or calculation component 108) operatively coupled to a processor (e.g., processor 106), a noiseless state and a noisy state of a layer in a quantum circuit.

At 704, computer-implemented method 700 can comprise rendering, by the system (e.g., via noise visualization system 102, visualization component 110, and/or interface component 202), a first visual representation of the noiseless state and a second visual representation of the noisy state at the layer in the quantum circuit.

At 706, computer-implemented method 700 can comprise calculating, by the system (e.g., via noise visualization system 102 and/or calculation component 108), the noise state based on at least one of a specification or a noise model of a computation component that executes the quantum circuit.

At 708, computer-implemented method 700 can comprise rendering, by the system (e.g., via noise visualization system 102, visualization component 110, and/or interface component 202), at multiple layers of the quantum circuit, visual representations of noiseless states and noisy states of the multiple layers to provide a visualization of noise effects on the quantum circuit, thereby facilitating at least one of reduced time or processing workload associated with generating at least one quantum circuit that yields a defined result when executed.

Noise visualization system 102 can be associated with various technologies. For example, noise visualization system 102 can be associated with quantum computing technologies, quantum circuit technologies, quantum circuit optimization technologies, quantum software and/or middleware technologies, quantum job technologies, quantum program technologies, quantum program parameter optimization technologies, quantum hardware and/or software technologies, quantum algorithm technologies, machine learning technologies, artificial intelligence technologies, cloud computing technologies, Internet of Things (IoT) technologies, and/or other technologies.

Noise visualization system 102 can provide technical improvements to systems, devices, components, operational steps, and/or processing steps associated with the various technologies identified above. For example, noise visualization system 102 can calculate a noiseless state (e.g., a noiseless state vector) and a noisy state (e.g., a noisy state vector) of a layer in a quantum circuit and render a first visual representation of the noiseless state and a second visual representation of the noisy state at the layer in the quantum circuit. In this example, noise visualization system 102 can render, at multiple layers of the quantum circuit, visual representations of noiseless states and noisy states of the multiple layers to provide a visualization of noise effects on the quantum circuit, thereby facilitating at least one of reduced time or processing workload associated with generating at least one quantum circuit that yields a defined result when executed. In this example, based on providing such a visualization of noise effects on the quantum circuit, noise visualization system 102 can thereby facilitate at least one of reduced time or processing workload associated with generating at least one quantum circuit that yields a defined result when executed. For instance, based on providing such a visualization of noise effects in the quantum circuit, noise visualization system 102 can thereby facilitate at least one of reduced time or processing workload associated with defining an optimized quantum circuit that yields a desired result when executed. That is, for example, noise visualization system 102 can provide a new, useful, and/or advantageous system, computer-implemented methodology, and/or computer program product to facilitate viewing and/or analyzing data from one or more layers of a quantum circuit that can enable an entity to understand the quantum circuit more holistically (e.g., compared to existing technologies). In this example, based on such improved holistic understanding of the quantum circuit, noise visualization system 102 can thereby enable such an entity to reduce the time and/or processing workload involved with iteratively modifying one or more elements of the quantum circuit until it yields a desired result (e.g., an optimized result) when executed.

Noise visualization system 102 can provide technical improvements to a processing unit (e.g., processor 106, a quantum processor, and/or another processor) associated with noise visualization system 102. For example, as described above, noise visualization system 102 can enable an entity to better understand noise effects in a quantum circuit, which can thereby enable the entity to reduce the time and/or processing workload involved with iteratively modifying one or more elements of the quantum circuit until it yields a desired result (e.g., an optimized result) when executed. In this example, noise visualization system 102 can thereby reduce computational cost of a processing unit (e.g., a CPU, a QPU, and/or another processing unit) used to analyze noise effects in various quantum circuits and/or further improve the performance and/or efficiency of such a processing unit.

A practical application of noise visualization system 102 is that it can be implemented in a quantum system to enable an entity to better understand noise effects on various quantum circuits that can be executed by the quantum system to compute one or more solutions (e.g., heuristic(s)) to a variety of problems ranging in complexity (e.g., an estimation problem, an optimization problem, and/or another problem) in a variety of domains (e.g., finance, chemistry, medicine, transportation, logistics, and/or another domain). For example, a practical application of noise visualization system 102 is that it can be implemented in a quantum system to enable an entity to better understand noise effects on various quantum circuits such that the entity can more quickly define a quantum circuit that can yield a desired result when executed by the quantum system to compute one or more solutions (e.g., heuristic(s)) to an estimation problem and/or an optimization problem in the domain of chemistry, medicine, and/or finance. In this example, such one or more solutions can be used to engineer, for instance, a new chemical compound, a new medication, and/or a new financial derivative pricing scheme.

It should be appreciated that noise visualization system 102 provides a new approach to analyzing various quantum circuits driven by relatively new quantum computing technologies. For example, noise visualization system 102 provides a new approach to visualize and/or analyze noise effects in various quantum circuits such that an entity can more easily and/or more quickly define a quantum circuit that can yield a desired result when executed by a quantum computing system and/or device.

Noise visualization system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. Noise visualization system 102 and/or components thereof, can be employed to solve new problems that arise through advancements in technologies mentioned above, employment of quantum computing systems, cloud computing systems, computer architecture, and/or another technology.

It is to be appreciated that noise visualization system 102 can utilize various combinations of electrical components, mechanical components, and circuitry that cannot be replicated in the mind of a human or performed by a human, as the various operations that can be executed by noise visualization system 102 and/or components thereof as described herein are operations that are greater than the capability of a human mind. For instance, the amount of data processed, the speed of processing such data, or the types of data processed by noise visualization system 102 over a certain period of time can be greater, faster, or different than the amount, speed, or data type that can be processed by a human mind over the same period of time.

According to several embodiments, noise visualization system 102 can also be fully operational towards performing one or more other functions (e.g., fully powered on, fully executed, and/or another function) while also performing the various operations described herein. It should be appreciated that such simultaneous multi-operational execution is beyond the capability of a human mind. It should also be appreciated that noise visualization system 102 can include information that is impossible to obtain manually by an entity, such as a human user. For example, the type, amount, and/or variety of information included in noise visualization system 102, calculation component 108, visualization component 110, and/or interface component 202 can be more complex than information obtained manually by a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
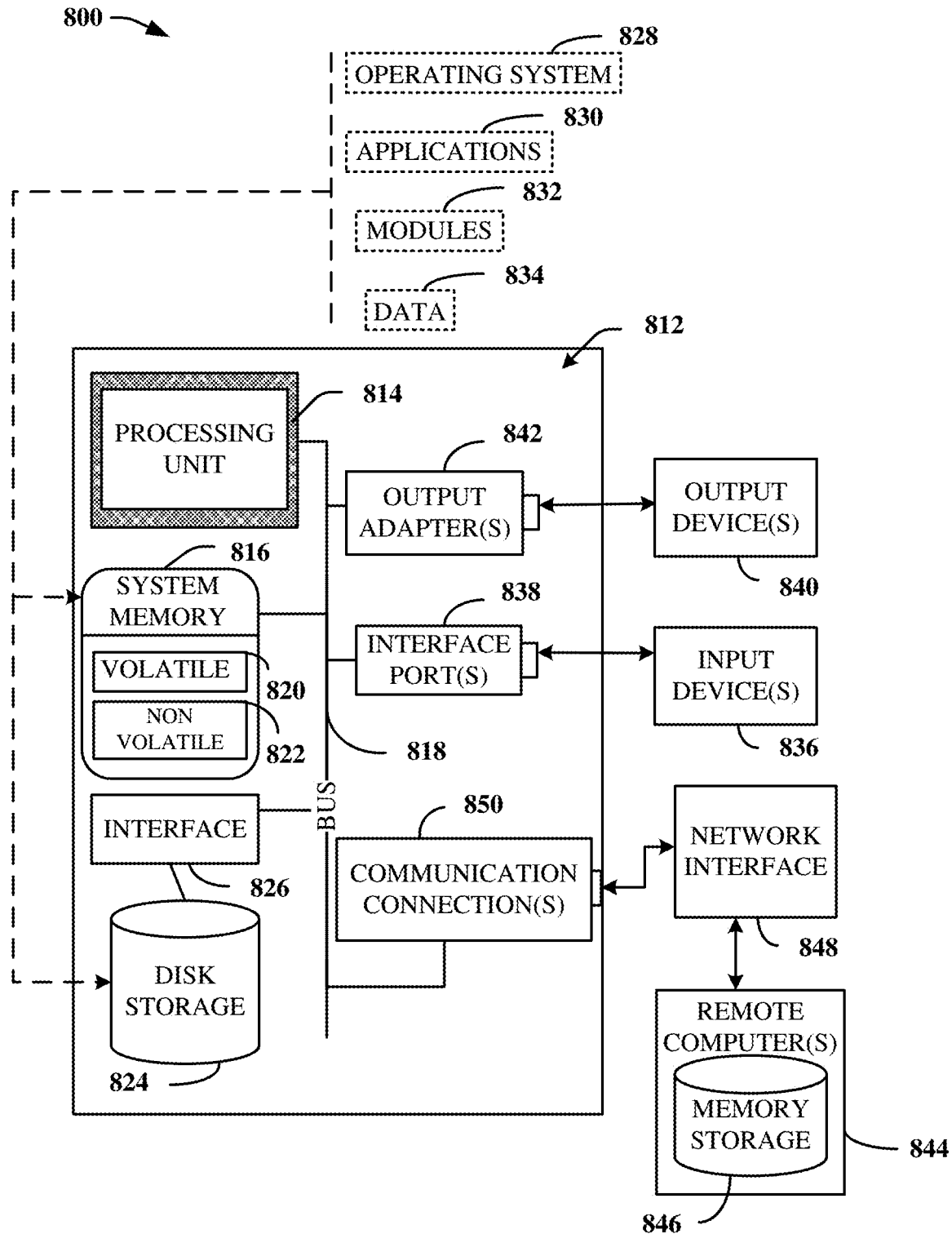
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing one or more embodiments described herein can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that one or more embodiments described herein can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

In some embodiments, noise visualization system 102 can be associated with a cloud computing environment. For example, noise visualization system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Noise visualization system 102 and/or components thereof (e.g., calculation component 108, visualization component 110, interface component 202, and/or another component) can employ one or more computing resources of cloud computing environment 950 described below with reference to FIG. 9 and/or one or more functional abstraction layers (e.g., quantum software) described below with reference to FIG. 10 to execute one or more operations in accordance with one or more embodiments described herein. For example, cloud computing environment 950 and/or such one or more functional abstraction layers can comprise one or more classical computing devices (e.g., classical computer, classical processor, virtual machine, server, and/or another classical computing device), quantum hardware, and/or quantum software (e.g., quantum computing system and/or device, quantum computer, quantum processor, quantum circuit simulation software, superconducting circuit, and/or other quantum hardware and/or quantum software) that can be employed by noise visualization system 102 and/or components thereof to execute one or more operations in accordance with one or more embodiments described herein. For instance, noise visualization system 102 and/or components thereof can employ such one or more classical and/or quantum computing resources to execute one or more classical and/or quantum: mathematical function, calculation, and/or equation; computing and/or processing script, routine, and/or instruction; algorithm; model (e.g., artificial intelligence (AI) model, machine learning (ML) model, and/or another type of model); and/or another operation in accordance with one or more embodiments described herein.

It is to be understood that although a detailed description on cloud computing is provided herein, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
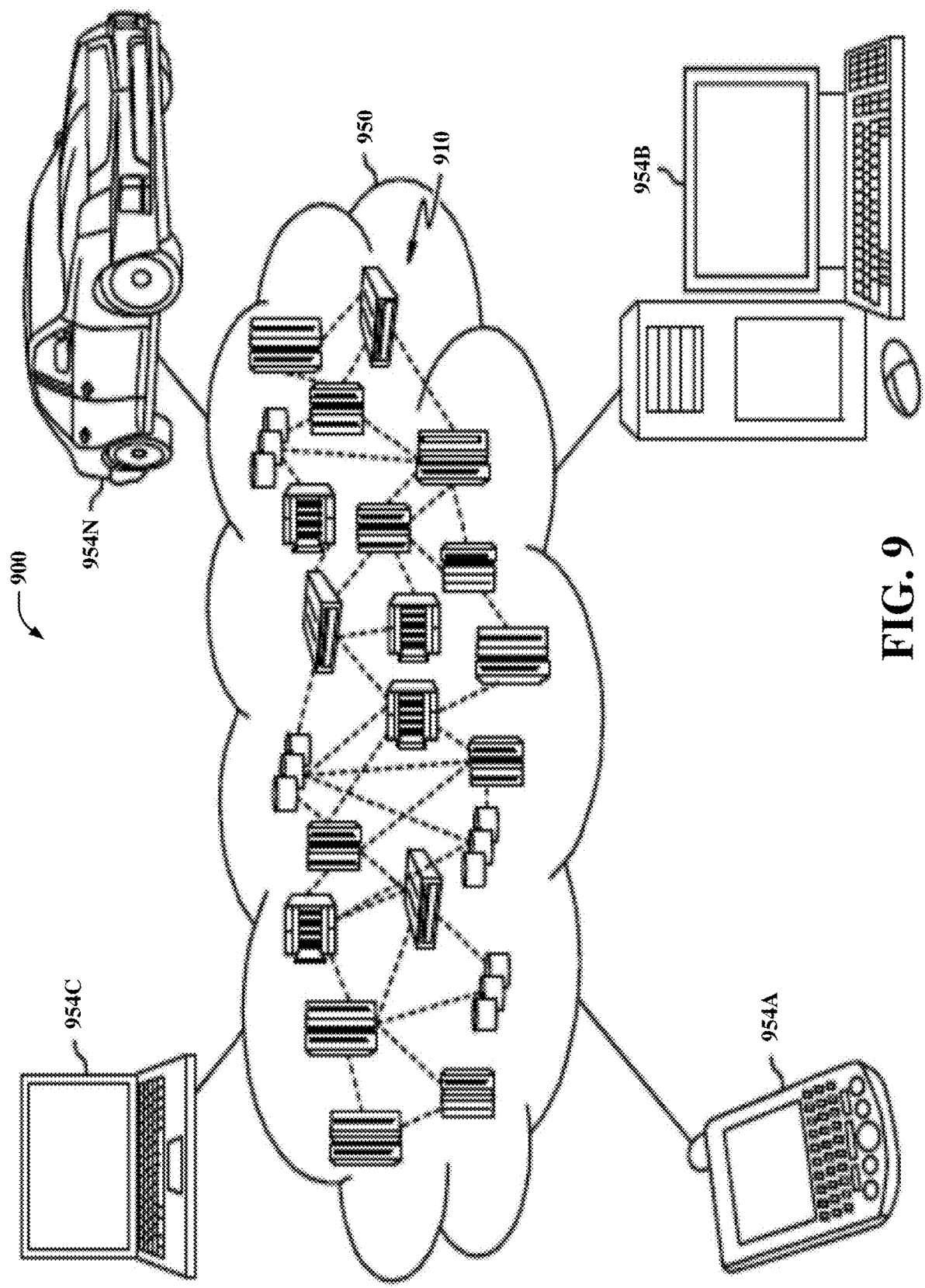
FIG. 9 illustrates a block diagram of an example, non-limiting cloud computing environment in accordance with one or more embodiments described herein.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, and/or another quantum platform) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
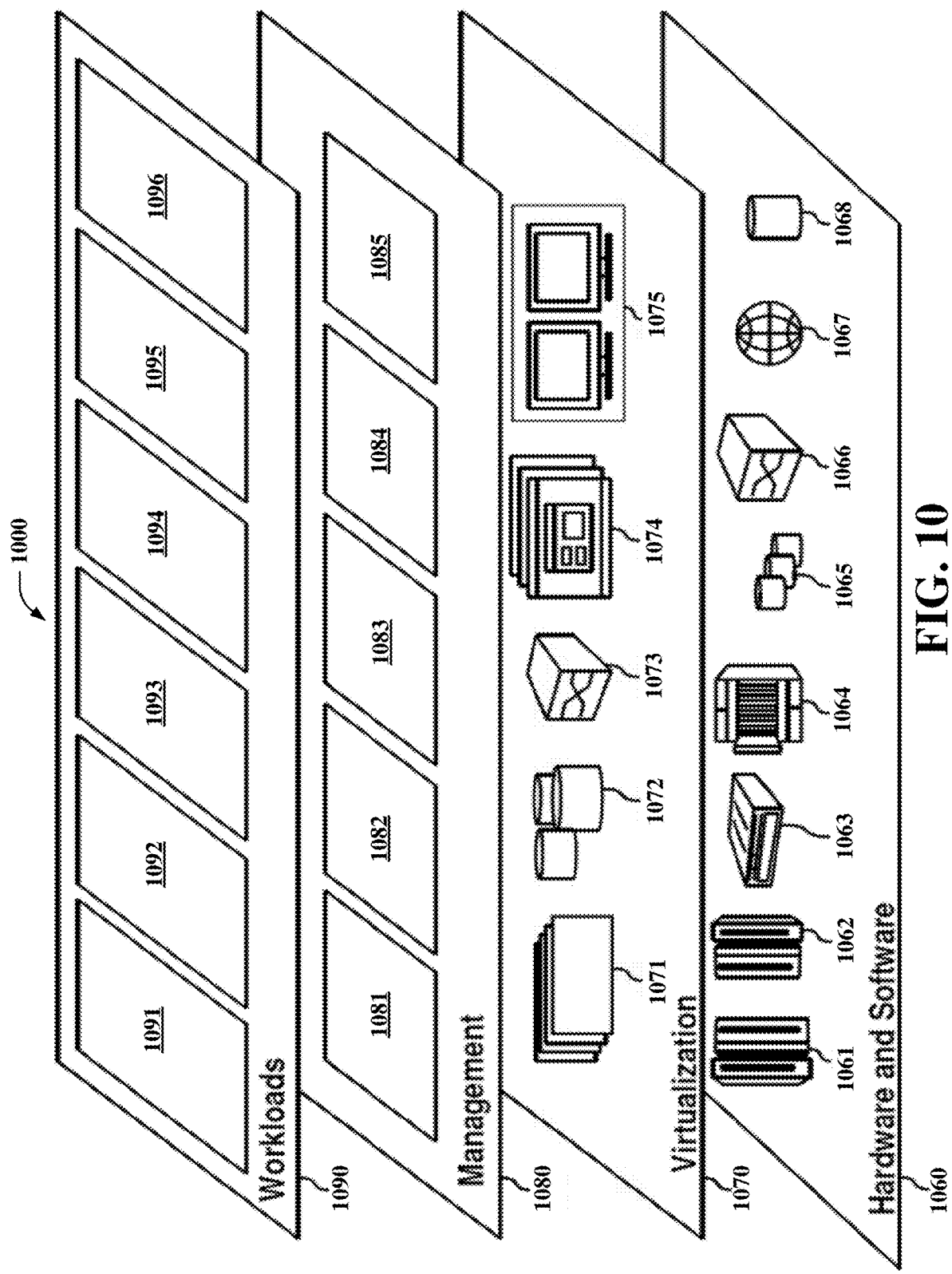
FIG. 10 illustrates a block diagram of example, non-limiting abstraction model layers in accordance with one or more embodiments described herein.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068. Although not illustrated in FIG. 10, in some embodiments, hardware and software layer 1060 can comprise one or more quantum hardware components (e.g., a quantum processor, a quantum computer, and/or another quantum hardware component) and/or one or more quantum software components (e.g., quantum platform routing software and/or another quantum software component).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and noise visualization software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Python, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that one or more embodiments described herein also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of one or more embodiments described herein can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability;

multi-core processors with hardware multithread technology; parallel platforms; and parallel platforms with distributed shared memory. Additionally, a processor (e.g., a classical processor (e.g., a CPU) and/or a quantum processor (e.g., a QPU)) can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. As used herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing one or more embodiments herein, but one of ordinary skill in the art can recognize that many further combinations and permutations of one or more embodiments described herein are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a processor that executes computer executable components stored in memory, the computer executable components comprising:
        a calculation component that calculates a noise state of a layer in a quantum circuit; and
        a visualization component that renders a visual representation of the noise state at the layer in the quantum circuit.

2. The system of claim 1, wherein the noise state is selected from a group consisting of a noisy state and a noiseless state.

3. The system of claim 1, wherein the calculation component calculates a noiseless state and a noisy state of the layer in the quantum circuit and the visualization component renders a first visual representation of the noiseless state and a second visual representation of the noisy state at the layer in the quantum circuit.

4. The system of claim 1, wherein the calculation component calculates the noise state based on at least one of a specification or a noise model of a computation component that executes the quantum circuit.

5. The system of claim 1, wherein the visual representation comprises a visualization of a probability density corresponding to the noise state.

6. The system of claim 1, wherein the visual representation comprises a gradient representation of a probability density corresponding to the noise state, and wherein a defined opacity value of the gradient representation corresponds to a defined probability value of the noise state.

7. The system of claim 1, wherein the visualization component renders, at multiple layers of the quantum circuit, visual representations of noiseless states and noisy states of the multiple layers to provide a visualization of noise effects on the quantum circuit, thereby facilitating at least one of reduced time or processing workload associated with generating at least one quantum circuit that yields a defined result when executed.

8. A computer-implemented method, comprising:
    calculating, by a system operatively coupled to a processor, a noise state of a layer in a quantum circuit; and
    rendering, by the system, a visual representation of the noise state at the layer in the quantum circuit.

9. The computer-implemented method of claim 8, wherein the noise state is selected from a group consisting of a noisy state and a noiseless state.

10. The computer-implemented method of claim 8, further comprising:
    calculating, by the system, a noiseless state and a noisy state of the layer in the quantum circuit; and
    rendering, by the system, a first visual representation of the noiseless state and a second visual representation of the noisy state at the layer in the quantum circuit.

11. The computer-implemented method of claim 8, further comprising:
    calculating, by the system, the noise state based on at least one of a specification or a noise model of a computation component that executes the quantum circuit.

12. The computer-implemented method of claim 8, wherein the visual representation comprises a visualization of a probability density corresponding to the noise state.

13. The computer-implemented method of claim 8, wherein the visual representation comprises a gradient representation of a probability density corresponding to the noise state, and wherein a defined opacity value of the gradient representation corresponds to a defined probability value of the noise state.

14. The computer-implemented method of claim 8, further comprising:
rendering, by the system, at multiple layers of the quantum circuit, visual representations of noiseless states and noisy states of the multiple layers to provide a visualization of noise effects on the quantum circuit, thereby facilitating at least one of reduced time or processing workload associated with generating at least one quantum circuit that yields a defined result when executed.

15. A computer program product comprising a non-transitory computer readable storage medium having program instructions embodied therewith, the program instructions executable by a processor to cause the processor to:
calculate, by the processor, a noise state of a layer in a quantum circuit; and
render, by the processor, a visual representation of the noise state at the layer in the quantum circuit.

16. The computer program product of claim 15, wherein the noise state is selected from a group consisting of a noisy state and a noiseless state.

17. The computer program product of claim 15, wherein the program instructions are further executable by the processor to cause the processor to:
calculate, by the processor, a noiseless state and a noisy state of the layer in the quantum circuit; and
render, by the processor, a first visual representation of the noiseless state and a second visual representation of the noisy state at the layer in the quantum circuit.

18. The computer program product of claim 15, wherein the program instructions are further executable by the processor to cause the processor to:
calculate, by the processor, the noise state based on at least one of a specification or a noise model of a computation component that executes the quantum circuit.

19. The computer program product of claim 15, wherein the visual representation comprises a visualization of a probability density corresponding to the noise state.

20. The computer program product of claim 15, wherein the visual representation comprises a gradient representation of a probability density corresponding to the noise state, and wherein a defined opacity value of the gradient representation corresponds to a defined probability value of the noise state.

* * * * *